Patented Nov. 14, 1950

2,530,316

UNITED STATES PATENT OFFICE 2,530,316

ESTER MODIFIED DRYING OIL ALKYD RESINS AND PROCESS OF MAKING SAME

John B. Rust and William B. Canfield, Montclair, N. J., assignors, by direct and mesne assignments, of one-half to Montclair Research Corporation, a corporation of New Jersey, and one-half to Ellis-Foster Company, a corporation of New Jersey No Drawing. Original application October 21, 1944, Serial No. 559,842. Divided and this application September 11, 1945, Serial No. 615,696

10 Claims. (Cl. 260—22)

This invention relates to modified drying oil-alkyd resins wherein the modifications are accomplished by means of beta-unsaturated monohydric alcohol esters of polycarboxylic acids.

Among the objects of the invention are: to provide a modified drying oil-alkyd resin which is both light colored and fast drying; to make a modified drying oil-alkyd resin which is stable in a solvent but which rapidly sets up to a hard, firm film immediately upon release of the solvent; to produce a modified drying oil-alkyd resin which may be kettle-heated rapidly at relatively low temperatures to the necessary degree of body, thus saving long periods of cooking at higher temperatures; to provide a modified drying oil-alkyd resin which air-dries to a hard, tough film; to obtain a drying oil-alkyd resin which may be baked, with or without driers, at a relatively low temperature to light colored, hard durable films; and to provide a modified drying oil-alkyd resin which is compatible with nitrocellulose to give lacquer films which are tough, elastic and harder than such nitrocellulose films without the modified alkyd resin.

These and other objects are attained by modifying a drying oil-alkyd resin with an ester containing a plurality of double bonds and comprising a polymerizable beta-unsaturated monohydric alcohol ester of a polycarboxylic acid. Esters of this type are high boiling, which permits the reactants to be heated without loss by volatilization, and they react with the alkyd resin to form a light-colored resin of improved hardening characteristics. Examples of polycarboxylic acid esters of this type are:

A. The diesters of beta-unsaturated monohydric alcohols and saturated dibasic acids, represented by the diesters of allyl, methallyl, crotyl, and chloroallyl alcohol and saturated acids such as phthaic, succinic, adipic, sebacic acid and the like, and B. Mono- and diesters of beta-unsaturated monohydric alcohols and unsaturated dibasic acids, the latter acids being illustrated by alpha-unsaturated alpha-beta-dicarboxylic acids such as maleic, fumaric, citraconic, itaconic, chloromaleic and 3,6-dihydrophthalic acids, and unsaturated hydrophthalic acids such as the adducts of alpha-unsaturated alpha-beta-dicarboxylic acids with conjugated polyenes as illustrated by the butadiene-maleic adduct, cyclpentadiene-fumaric acid adduct, isoprene-acetylene dicarboxylic acid adduct, etc. The esters used herein are polyfunctional, containing at least two double bonds. The modified drying oil-alkyd resin of this invention is one that has the drying oil fatty acid radicals thereof combined with a polymerizable polycarboxylic acid ester containing a plurality of double bonds.

The alkyd resin which is to be modified may be first prepared and subsequently reacted with the unsaturated ester, or all the ingredients of the alkyd resin (drying oil acids, polycarboxylic acid, polyhydric alcohol), together with the unsaturated ester, may be heated simultaneously. Various other modifications may also be used. For example, the polyhydric alcohol and the drying oil acids may be first combined and the reaction product thereof then heated with the polycarboxylic acid and the unsaturated ester. Or, the polycarboxylic acid and the polyhydric alcohol may be at least partially combined and this product reacted with the drying oil acids in the presence of the unsaturated ester.

A wide selection of polycarboxylic acids, polyhydric alcohols and drying oil acids is available for the production of the drying oil alkyds used herein. In the examples which follow the reactants have been limited to those used in the making of the more familiar types of alkyd resins, but they may include many others.

Among the polyhydric alcohols so included are glycerol, diethylene glycol, pentaerythritol, dipentaerythritol, sorbitol, mannitol, trihydroxymethylaminomethane, trimethylolpropane, and the like.

Among the polycarboxylic acids so included are maleic anhydride, fumaric acid, phthalic anhydride, succinic acid, malonic acid, adipic acid, sebacic acid and the like, and various maleic acid adducts such as those from cyclopentadiene and terpenes.

Among the fatty acids so included are those of linseed oil, cottonseed oil, China-wood oil, oiticica oil, perilla oil, soya bean oil, sunflower seed oil, and the like. Also the individual acids and such unsaturated acids as oleic are to be regarded in the same manner.

The following is an outline of the process when all ingredients are heated simultaneously. A mixture containing a polyhydric alcohol, drying oil acids, polycarboxylic acid and a beta-unsaturated monohydric alcohol ester of a polycarboxylic acid, such as diallyl maleate, is heated at 200°–250° C. for about ½ to 4 hours, depending upon the temperature. A suitable reactor may be a kettle provided with thermometer, air-condenser and agitator. During heating the reaction mixture thickens rapidly and finally a stage is reached where a cold drop of the melt on a glass plate can be pulled out into strings. The period between the initial string stage and the point of gelation is relatively short, so that rapid cooling is sometimes necessary to prevent the formation of an insoluble and infusible resin. Since the reaction temperature is relatively low the cooling may often be hastened by cutting with a solvent for the resin.

The same general procedure of heating is used with the above-noted alternative methods of making the products of this invention and in all cases the unsaturated ester is heated with the ingredients which go to make up a drying oil-alkyd resin, these latter ingredients being in a previously reacted, partially reacted or unreacted form. The process results in a light colored, tough, alkyd resin of low molecular weight and soluble in various solvents, particularly coal-tar hydrocarbons, to form quick-hardening coating compositions. The amount of solvent needed to get a solution of suitable working consistency is from 40 to about 60% by weight. Solvents include aromatic hydrocarbons, esters, ketones, alcohol-ethers and higher alcohols. Aliphatic hydrocarbons may be used as diluents.

To obtain the modified alkyd resins of this invention the unsaturated ester (e. g., diallyl maleate) is required in amount equivalent to about 10% to 40% of the composition, and drying oil acids between about 40% and 60%.

The compositions may be further modified in various ways with other resins. For example, a drying oil-alkyd resin in association with a phenol-aldehyde condensation product or other resin can be treated with an unsaturated polycarboxylate such as diallyl maleate or dimethallyl phthalate. A particular advantage in the case of baked coatings is obtained by including an alcohol-modified urea-formaldehyde resin in a solution of the modified alkyd resin.

The following examples are given to illustrate the invention, and in no case should be considered as limiting. Parts are by weight.

*Example 1.*—24.8 parts of glycerol, 37.8 parts of linseed oil acids, 42.8 parts of phthalic anhydride, and 26.8 parts of diallyl maleate are heated together to 200° C. in 25 minutes and maintained at 200°–220° C. for 55 minutes. The alkyd resin was soluble, light-colored, clear, and could be drawn into strings 18″–24″ in length.

*Example 2.*—31 parts of glycerol, 47.3 parts of linseed oil acids, 58.5 parts of phthalic anhydride, and 16.5 parts of diallyl maleate were heated to 200° C. over a period of 17 minutes. Heating was continued at 200°–220° C. for 63 minutes. A clear, light colored, soluble alkyd resin was secured, which could be drawn into strings 18″–24″ long.

*Example 3.*—42 parts of linseed oil acids, 9.2 parts of glycerol, 11.1 parts of phthalic anhydride, and 25 parts of diallyl fumarate were heated to 210° C. over a period of 20 minutes. Heating was continued at 210° C.–230° C. for 1¾ hours. This produced a light-colored, clear, soluble alkyd resin which could be drawn into strings 18″–21″ in length.

*Example 4.*—18.4 parts of glycerol, 38 parts of soya bean oil acids, 29.6 parts of phthalic anhydride, and 31.2 parts of monoallyl maleate were heated together to 200° C. in 25 minutes. Heating was continued thereafter at 210°–220° C. for approximately 1¼ hours. A clear light-colored, soluble alkyd resin was obtained which could be drawn into strings 18″–21″ long.

*Example 5.*—24.8 parts of glycerol, 37.8 parts of linseed oil acids, 42.8 parts of phthalic anhydride, and 26.3 parts of diallyl phthalate were heated together to 200° C. over a period of 25 minutes. Heating was continued at 210–230° C. for 1½ hours. By this means a light-colored, clear, soluble alkyd resin was produced which could be drawn into a string 18″–24″ in length.

*Example 6.*—37.8 parts of linseed oil acids, 24.8 parts of glycerol, 42.8 parts of phthalic anhydride, and 26.3 parts of the diallyl ester of cyclopentadiene-maleic acid were heated together to 200° C. over a period of 40 minutes. Heating was continued at 210°–220° C. for a period of 55 minutes. A light-colored, clear soluble alkyd resin was secured which could be drawn into a string 18″–24″ in length.

*Example 7.*—24.8 parts of glycerol, 37.8 parts of linseed oil acids, and 42.8 parts of phthalic anhydride, and 26.3 parts of a reaction product of diallyl fumarate and cyclopentadiene were heated together to 200° C. over a period of 25 minutes. Heating was continued for 1¼ hours. The product was a light-colored, clear, soluble alkyd resin which could be drawn into strings 18″–24″ in length.

*Example 8.*—36.3 parts of trihydroxymethylamino methane and 84 parts of soya bean oil acids were heated at 230°–240° C. for 2 hours. 66.6 parts of phthalic anhydride and 42.7 parts of the diallyl ester of a butadiene-maleic anhydride adduct (diallyl tetrahydrophthalate) were then added and heating continued at 210°–230° C. for 1⅓ hours. A light-colored, clear, soluble resin was obtained which could be drawn into strings 18″–24″ in length.

*Example 9.*—35 parts of linseed oil acids, 23.1 parts of glycerol, 63 parts of sebacic acid and 26.9 parts of the diallyl ester of an isoprene-maleic anhydride adduct (diallyl methyl-tetrahydrophthalate) were heated together to 200° C. in 30 minutes. Heating was continued at 210°–230° C. for ¾ hour. A clear, light-colored, soluble alkyd resin was produced which could be drawn into strings 18″–24″ long.

*Example 10.*—40.8 parts of pentaerythritol, and 84.0 parts of soya bean oil acids were heated together at 230° C. for 2 hours. 66.6 parts of phthalic anhydride and 42.7 parts of the diallyl ester of an isoprene-maleic anhydride adduct were added and heating continued at 210°–230° C. for 1½ hours. The reaction product was a light-colored, clear, soluble alkyd resin which could be drawn into strings.

*Example 11.*—56 parts of linseed oil acids and 18.4 parts of glycerol were heated together at 230° C. for 2 hours to form the monoglyceride. 9.8 parts of maleic anhydride, 14.8 parts of phthalic anhydride, and 10.4 parts of a reaction product of diallyl citraconate and cyclopentadiene were added. Heating was continued at 225°–240° C. for 2½ hours. The resulting alkyd resin was clear and light-colored, and could be drawn into strings 15″–18″ in length.

The following example is intended to show the rapidity with which the resins of this invention are convertible by heat to the insoluble, infusible form.

*Example 12.*—16.8 parts (0.06 mole) of linseed oil acids, 11.0 parts (0.12 mole) of glycerol, 22.2 parts (0.15 mole) of phthalic anhydride, and 30 parts of diallyl maleate were heated together to 200° C. in ½ hour. Heating was continued at 200°–220° C. for 35 minutes, whereupon an insoluble, infusible resin was secured. This may be compared with an alkyd resin formed from equal moles of phthalic anhydride, glycerol and linseed oil acids, which does not gel in 4 hours when heated at 240°–250° C.

(A) *Baking tests.*—Resin solutions (50% in xylene) of the various soluble resins given above as examples were flowed on glass plates and then air-dried for 1 hour, followed by baking for 1 hour at 140° C. The following shows the relative hardness and color.

| Example | Sward Hardness | Color of Film |
|---|---|---|
| 1 | 29 | Light |
| 2 | 39 | Light |
| 3 | 29 | Light |
| 4 | 21 | Light |
| 5 | 27 | Light |
| 6 | 33 | Light |
| 7 | 31 | Light |
| 8 | 29 | Dark |
| 9 | 21 | Light |
| 10 | 27 | Light |
| 11 | 25 | Light |
| Rezyl 1103 | 19 | Dark |

Rezyl 1103 is a phthalic glyceride drying oil acids resin containing 40% base phthalate resin (glyceryl phthalate) and 60% drying oil acids and possessing an acid number of 27–34.

(B) *Air-drying tests.*—Resin solutions containing 50% solids to which were added 0.5% lead and 0.02% cobalt drier (as naphthenates) were poured and allowed to air-dry. The following table shows the time required by each example to dry.

| Example | Tack-Free Hardness |
|---|---|
|  | Hours |
| 1 | 4½ |
| 2 | 6 |
| 3 | 6½ |
| 4 | 5 |
| 5 | 6 |
| 6 | 8 |
| 7 | 10 |
| 8 | 5½ |
| 9 | 24 |
| 10 | 10 |
| 11 | 10 |
| Rezyl 1103 | 24 |

(C) *Nitrocellulose lacquers.*—Several resins of this invention were blended with half-second nitrocellulose to form lacquers of the following composition:

6.67 parts of resin
3.33 parts of nitrocellulose
10.00 parts of xylol
20.00 parts of butyl acetate The nitrocellulose-resin lacquer solutions were flowed on glass plates and allowed to air-dry. The Sward Rocker hardness of these films was obtained after 1 and 24 hours to observe the rate of drying.

| Example | Sward Hardness | |
|---|---|---|
|  | 1 hour | 24 hours |
| 1 | 29 | 39 |
| 4 | 37 | 43 |
| 5 | 31 | 49 |
| 6 | 37 | 47 |
| 7 | 29 | 43 |
| Rezyl 1103 | 31 | 37 |

This case is a division based on our copending application Serial No. 559,842, filed October 21, 1944.

We claim:

1. The process of making a soluble modified drying oil-alkyd resin a cold drop of which may be drawn into strings, comprising heating simultaneously in the absence of a catalyst, at between 200° and 250° C., a polymerizable polycarboxylic acid ester containing a plurality of carbon-carbon double bonds and comprising a beta-unsaturated monohydric alcohol ester of a polycarboxylic acid, said polymerizable ester being selected from the group consisting of monoesters of allyl, methallyl, crotyl and chloroallyl alcohols with maleic, fumaric, citraconic, itaconic, chloromaleic, 3:6-dihydrophthalic acids, butadiene-maleic adduct, cyclopentadiene-fumaric adduct, and isoprene-acetylene dicarboxylic acid adduct, and diesters of allyl, methallyl crotyl, and chloroallyl alcohols with phthalic, succinic, adipic, sebacic, maleic, fumaric, citraconic, itaconic, chloromaleic, 3:6-dihydrophthalic acids, butadiene-maleic adduct, cyclopentadiene-fumaric adduct and isoprene-acetylene dicarboxylic acid adduct, and the diesters of allyl alcohol with cyclopentadiene-maleic adduct and with isoprene-maleic adduct, with the fatty acids of a drying oil selected from the group consisting of linseed, cottonseed, China-wood, oiticica, perilla, soya bean and sunflower seed oils, a polyhydric alcohol selected from the group consisting of glycerol, diethylene glycol, pentaerythritol, dipentaerythritol, sorbitol, mannitol, trihydroxymethylaminomethane, and trimethylolpropane, and a polycarboxylic acid selected from the group consisting of maleic anhydride, fumaric acid, phthalic anhydride, succinic acid, malonic acid, adipic acid, sebacic acid, and cyclopentadiene-maleic adduct, the unsaturated ester being 10% to 40% by weight of the composition and the other reactants being in proportion to form a drying oil-alkyd resin in which the said fatty acids are from 40% to 60% by weight of the composition.

2. The process of making a soluble modified drying oil-alkyd resin as set forth in claim 1 in which the polymerizable ester is an allyl ester of an alpha-unsaturated alpha-beta dicarboxylic acid.

3. The process of making a soluble modified drying oil-alkyd resin a cold drop of which may be drawn into strings, comprising heating simultaneously in the absence of a catalyst at between 200° and 250° C. an allyl ester of 3:6-dihydrophthalic acid, with the fatty acids of a drying oil selected from the group consisting of linseed, cottonseed, China-wood, oiticica, perilla, soya bean and sunflower seed oils, a polyhydric alcohol selected from the group consisting of glycerol, diethylene glycol, pentaerythritol, dipentaerythritol, sorbitol, mannitol, trihydroxymethylaminomethane, and trimethylolpropane, and a polycarboxylic acid selected from the group consisting of maleic anhydride, fumaric acid, phthalic anhydride, succinic acid, malonic acid, adipic acid, sebacic acid, and cyclopentadiene-maleic adduct, the allyl ester being 10% to 40% of the composition and the other reactants being in proportion to form a drying oil-alkyd resin in which the said fatty acids are from 40% to 60% by weight of the composition.

4. The process of making a soluble modified drying oil-alkyd resin as set forth in claim 1 in which the polymerizable ester is a diallyl ester of an alapha-unsaturated alpha-beta dicarboxylic acid.

5. The process of making a soluble modified drying oil-alkyd resin a cold drop of which may be drawn into strings, comprising heating simultaneously in the absence of a catalyst at between 200° and 250° C., diallyl maleate with the fatty acids of a drying oil selected from the group consisting of linseed, cottonseed, China-wood, oiticica, perilla, soya bean and sunflower seed oils, a polyhydric alcohol selected from the group consisting of glycerol, diethylene glycol, pentaerythritol, dipentaerythritol, sorbitol, mannitol, trihydroxymethylaminomethane, and trimethylolpropane and a polycarboxylic acid selected from the group consisting of maleic anhydride, fumaric acid, phthalic anhydride, succinic acid, malonic acid, adipic acid, sebacic acid, and cyclopentadiene-maleic adduct, the diallyl maleate being 10% to 40% of the composition and the other reactants being in proportion to form a drying oil-alkyd resin in which the said fatty acids are from 40% to 60% by weight of the composition.

6. The process of making a soluble modified drying oil-alkyd resin a cold drop of which may be drawn into strings, comprising heating simultaneously in the absence of a catalyst, at between 200° and 250° C., diallyl cyclopentadiene-maleate with the fatty acids of a drying oil selected from the group consisting of linseed, cottonseed, China-wood, oiticica, perilla, soya bean and sunflower seed oils, a polyhydric alcohol selected from the group consisting of glycerol, diethylene glycol, pentaerythritol, dipentaerythritol, sobitol, mannitol, trihydroxymethylaminomethane, and trimethylolpropane and a polycarboxylic acid selected from the group consisting of maleic anhydride, fumaric acid, phthalic anhydride, succinic acid, malonic acid, adipic acid, sebacic acid and cyclopentadiene-maleic adduct, the diallyl ester being 10% to 40% of the composition and the other reactants being in proportion to form a drying oil-alkyd resin in which the said fatty acids are from 40% to 60% by weight of the composition.

7. The process of making a soluble modified drying oil-alkyd resin a cold drop of which may be drawn into strings, comprising heating simultaneously in the absence of a catalyst at between 200° and 250° C., a diallyl phthalate with the fatty acids of a drying oil selected from the group consisting of linseed oil, cottonseed, China-wood, oiticica, perilla, soya bean and sunflower seed oils, a polyhydric alcohol selected from the group consisting of glycerol, diethylene glycol, pentaerythritol, dipentaerythritol, sorbitol, mannitol, trihydroxymethylaminomethane and trimethylolpropane and a polycarboxylic acid selected from the group consisting of maleic anhydride, fumaric acid, phthalic anhydride, succinic acid, malonic acid, adipic acid, sebacic acid, and cyclopentadiene-maleic adduct, the diallyl phthalate being 10% to 40% of the composition and the other reactants being in proportion to form a drying oil-alkyd resin in which the said fatty acids are from 40% to 60% by weight of the composition.

8. The process of making a soluble modified drying oil-alkyd resin a cold drop of which may be drawn into strings, comprising heating simultaneously in the absence of a catalyst, at between 200° and 250° C., a polymerizable polycarboxylic acid ester containing a plurality of carbon-carbon double bonds and comprising a beta-unsaturated monohydric alcohol ester of a polycarboxylic acid said polymerizable ester being selected from the group consisting of monoesters of allyl, methallyl, crotyl and chloroallyl alcohols with maleic, fumaric, citraconic, itaconic, chloromaleic, 3:6-dihydrophthalic acids, butadiene-maleic adduct, cyclopentadiene-fumaric adduct, and isoprene-acetylene dicarboxylic acid adduct, and diesters of allyl, methallyl, crotyl, and chloroallyl alcohols with phthalic, succinic, adipic, sebacic, maleic, fumaric, citraconic, itaconic, chloromaleic, 3:6-dihydrophthalic acids, butadiene-maleic adduct, cyclopentadiene-fumaric adduct and isoprene-acetylene dicarboxylic acid adduct, and the diesters of allyl alcohol with cyclopentadiene-maleic adduct and with isoprene-maleic adduct, with linseed oil fatty acids, a polyhydric alcohol selected from the group consisting of glycerol, diethylene glycol, pentaerythritol, dipentaerythritol, sorbitol, mannitol, trihydroxymethylaminomethane, and trimethylolpropane and a polycarboxylic acid selected from the group consisting of maleic anhydride, fumaric acid, phthalic anhydride, succinic acid, malonic acid, adipic acid, sebacic acid, and cyclopentadiene-maleic adduct; the unsaturated alcohol ester being 10% to 40% of the composition and the other reactants being in proportion to form a drying oil-alkyd resin in which the said fatty acids are from 40% to 60% by weight of the composition.

9. The process of making a soluble modified drying oil-alkyd resin a cold drop of which may be drawn into strings, comprising heating simultaneously in the absence of a catalyst at between 200° and 250° C., a polymerizable polycarboxylic acid ester containing a plurality of carbon-carbon double bonds and comprising a beta-unsaturated monohydric alcohol ester of a polycarboxylic acid said polymerizable ester being selected from the group consisting of monoesters of allyl, methallyl, crotyl, and chloroallyl alcohols with maleic, fumaric, citraconic, itaconic, chloromaleic, 3:6-dihydrophthalic acids, butadiene-maleic adduct, cyclopentadiene-fumaric adduct, and isoprene-acetylene dicarboxylic acid adduct, and diesters of allyl, methallyl, crotyl, and chloroallyl alcohols with phthalic, succinic, adipic, sebacic, maleic, fumaric, citraconic, itaconic, chloromaleic, 3:6-dihydrophthalic acids, butadiene-maleic adduct, cyclopentadiene-fumaric adduct and isoprene-acetylene dicarboxylic acid adduct, and the diesters of allyl alcohol with cyclopentadiene-maleic adduct and with isoprene-maleic adduct, with soya bean oil fatty acids, a polyhydric alcohol selected from the group consisting of glycerol, diethylene glycol, pentaerythritol, dipentaerythritol, sorbitol, mannitol, trihydroxymethylaminomethane, and trimethylolpropane and a polycarboxylic acid selected from the group consisting of maleic anhydride, fumaric acid, phthalic anhydride, succinic acid, malonic acid, adipic acid, sebacic acid, and cyclopentadiene-maleic adduct, the unsaturated alcohol ester being 10% to 40% of the composition and the other reactants being in proportion to form a drying oil-alkyd resin in which the said fatty acids are from 40% to 60% of the composition.

10. The process of making a soluble modified drying oil-alkyd resin, a cold drop of which may be drawn into strings, comprising heating simultaneously in the absence of a catalyst at between 200° and 250° C., a polymerizable polycarboxylic acid ester containing a plurality of carbon-carbon double bonds and comprising a beta-unsaturated monohydric alcohol ester of a polycarboxylic acid said polymerizable ester being selected from the group consisting of monoesters of allyl, methallyl, crotyl and chloroallyl alcohols with maleic, fumaric, citraconic, itaconic, choromaleic, 3:6-dihydrophthalic acids, butadiene-maleic adduct, cyclopentadiene-fumaric adduct, and isoprene-acetylene dicarboxylic acid adduct, and diesters of allyl, methallyl, crotyl, and chloroallyl alcohols with phthalic, succinic, adipic, sebacic, maleic, fumaric, citraconic, itaconic, chloromaleic, 3:6-dihydrophthalic acids, butadiene-maleic adduct, cyclopentadiene-fumaric adduct and isoprene-acetylene dicarboxylic acid adduct, and the diesters of allyl alcohol with cyclopentadiene-maleic adduct and with isoprene-maleic adduct, with the fatty acids of a drying oil selected from the group consisting of linseed oil, cottonseed, China-wood, oiticica, perilla, soya bean and sunflower seed oils, glycerol and phthalic anhydride, the unsaturated alcohol ester being 10% to 40% of the composition and the other reactants being in proportion to form a drying oil-alkyd resin in which the said fatty acids are from 40% to 60% by weight of the composition.

JOHN B. RUST.
WILLIAM B. CANFIELD.

REFERENCES CITED

The following references are of record in the file of this patent:

UNITED STATES PATENTS

| Number | Name | Date |
|---|---|---|
| 2,407,479 | D'Alelio | Sept. 10, 1946 |

FOREIGN PATENTS

| Number | Country | Date |
|---|---|---|
| 540,168 | Great Britain | Oct. 8, 1941 |